US009701173B2

(12) United States Patent
Jackson et al.

(10) Patent No.: US 9,701,173 B2
(45) Date of Patent: Jul. 11, 2017

(54) METHOD AND APPARATUS FOR THE REDUCTION OF WASHER FLUID ODOR IN THE PASSENGER COMPARTMENT OF A VEHICLE

(71) Applicant: Ford Global Technologies, LLC, Dearborn, MI (US)

(72) Inventors: Kenneth J. Jackson, Dearborn, MI (US); Dale Scott Crombez, Livonia, MI (US); Mary-Margaret Wenz Crombez, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 712 days.

(21) Appl. No.: 13/861,861

(22) Filed: Apr. 12, 2013

(65) Prior Publication Data

US 2014/0305624 A1    Oct. 16, 2014

(51) Int. Cl.
*B60H 1/00* (2006.01)
*B60H 1/32* (2006.01)

(52) U.S. Cl.
CPC ..... *B60H 1/00764* (2013.01); *B60H 1/00821* (2013.01); *B60H 1/00849* (2013.01); *B60H 1/00735* (2013.01); *B60H 1/00785* (2013.01); *B60H 1/00828* (2013.01); *B60H 2001/3282* (2013.01)

(58) Field of Classification Search
CPC ............ B60H 1/00735; B60H 1/00785; B60H 1/00764; B60H 1/00849
USPC ........................................................ 165/202
See application file for complete search history.

(56) References Cited

U.S. PATENT DOCUMENTS

| | | | | |
|---|---|---|---|---|
| 5,579,994 | A | * | 12/1996 | Davis, Jr. ........... B60H 1/00735 236/49.3 |
| 5,657,929 | A | * | 8/1997 | DeWitt ..................... B60S 1/52 15/250.02 |
| 6,067,808 | A | | 5/2000 | Dage |
| 6,069,461 | A | | 5/2000 | Jaworski et al. |
| 6,236,180 | B1 | * | 5/2001 | Contos .................... B60S 1/485 15/250.02 |
| 6,719,215 | B2 | | 4/2004 | Drouillard |
| 7,055,336 | B2 | * | 6/2006 | Menager ............ B60H 1/00785 236/44 C |
| 7,625,274 | B2 | | 12/2009 | Geiger |

(Continued)

*Primary Examiner* — Justin Jonaitis
*Assistant Examiner* — Joel Attey
(74) *Attorney, Agent, or Firm* — LeClairRyan

(57) ABSTRACT

A climate control system including an air controller switchable between fresh air, recirculated air, and partial recirculated air modes is disclosed. The system further includes a control module connected to the controller and a link operatively connecting the washer fluid system and the module. When the washer fluid system is activated, the module switches the controller from the fresh air mode to the recirculated air mode, preventing washer fluid odors from entering the vehicle cabin while the washer fluid system is activated. The module can also selectively switch the air controller between fresh, recirculated, and partial recirculated air modes based on condition inputs. Non-limiting examples of condition inputs include a fog look-up table, wet bulb level, humidity level, air quality level, and temperature level. The module directs the air controller to switch to the fresh air mode based on information generated by one or more of the condition inputs.

10 Claims, 2 Drawing Sheets

(56) References Cited

U.S. PATENT DOCUMENTS

| | | | |
|---|---|---|---|
| 7,625,275 B1 | 12/2009 | Hoke et al. | |
| 2002/0005440 A1* | 1/2002 | Holt | B05B 7/08 |
| | | | 239/284.2 |
| 2003/0041897 A1 | 3/2003 | Lee et al. | |
| 2003/0234031 A1 | 12/2003 | Krause et al. | |
| 2004/0046518 A1 | 3/2004 | Krause et al. | |
| 2006/0035578 A1* | 2/2006 | Geiger | B60H 1/00785 |
| | | | 454/139 |
| 2009/0314847 A1* | 12/2009 | Nemoto | B60H 1/00764 |
| | | | 237/5 |
| 2012/0009859 A1* | 1/2012 | Wijaya | B60H 1/00764 |
| | | | 454/75 |

\* cited by examiner

METHOD AND APPARATUS FOR THE REDUCTION OF WASHER FLUID ODOR IN THE PASSENGER COMPARTMENT OF A VEHICLE

TECHNICAL FIELD

The disclosed invention relates generally to the management of washer fluid odors in the passenger compartment of a vehicle. More particularly, the disclosed invention relates to a method and apparatus for reducing the fluid odor in the passenger compartment of a vehicle by automatically switching the climate control system to recirculation when the windshield washer is activated.

BACKGROUND OF THE INVENTION

Windshield washer fluid for use in conjunction with windshield wipers has been available on vehicles at least since the mid-1930s. While available in a broad variety of formulations, most windshield washer fluid used today comprises about 40% methanol alcohol which is proven highly effective in eliminating insect remains from the vehicle windshield. (As an alternative to methanol alcohol some windshield washer fluid compositions use ethanol or ethylene glycol.) Additional ingredients include a blue dye from a powder and, in colder climates, methylated spirits to lower the freezing point of the washer fluid. Regardless of the formulation, most windshield washer fluids have an unpleasant odor.

In addition to improved methods for maintaining a clean windshield, other developments in vehicle passenger comfort have taken place concurrently, including ventilation systems. Today's modern heating, ventilation and air conditioning system (HVAC) system includes a variety of operator modes, including "fresh air" and "recirculation" modes. The fresh air mode is based on a system in which fresh air is brought from the outside into the vehicle. In most vehicles the fresh air intake is located between the trailing edge of the vehicle's engine hood and the leading edge of the vehicle's windshield.

Placement of the fresh air intake between the vehicle's engine hood and windshield has the advantage of orienting the intake proximate the vehicle's instrument panel and associated duct system. However, placement of the fresh air intake in this area also results in the fresh air intake being close to the windshield washer fluid spray nozzles. If the windshield washer fluid is used by the operator in conjunction with the windshield wipers while the HVAC is in the fresh air mode, very commonly the odor of the windshield washer fluid enters the vehicle cabin.

The situation described above may arguably be corrected if the vehicle operator is able to manually select the recirculation mode over the fresh air mode prior to engaging the windshield washer fluid, returning to the fresh air mode after the windshield has been cleaned. However, this approach is impractical and unlikely to be used often if at all.

As in so many areas of vehicle technology there is always room for improvement related to the use and operation of windshield washer fluid.

SUMMARY OF THE INVENTION

The disclosed invention overcomes the problems of known windshield washer fluid systems by providing a climate control system that includes an air controller switchable between a fresh air mode, a recirculated air mode, and a partial recirculated air mode. The system further includes a control module connected to the air controller and a link operatively connecting the washer fluid system and the control module. In its most fundamental form when the washer fluid system is activated the control module switches the air controller from the fresh air mode to the recirculated air mode. In this way washer fluid odors are prevented from entering the vehicle cabin while the washer fluid system is activated.

The control module can selectively switch the air controller between the fresh air, recirculated, and partial recirculated air modes. Selection is based on condition inputs. Non-limiting examples of condition inputs include a fog look-up table (or some other data source), wet bulb level, humidity level, air quality level, and temperature level. The control module directs the air controller to switch to the fresh air mode based on information generated by one or more of the condition inputs. In addition, the control module further includes a delay timer to delay returning from the recirculated mode to the fresh air mode following deactivation of the washer fluid system based on one or more of the condition inputs.

The climate control system of the disclosed invention further includes a multi-speed blower connected to the control module. The control module can switch the multi-speed blower to a lower speed in the event that switching to the recirculated air mode from either the fresh air mode or the partial recirculated air mode is not possible based on one or more of the inputs. In this way the degree of windshield washer fluid odor is minimized.

The delay timer may also function to delay for a selected time returning from the recirculated mode to the fresh air mode following deactivation of the washer fluid system.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
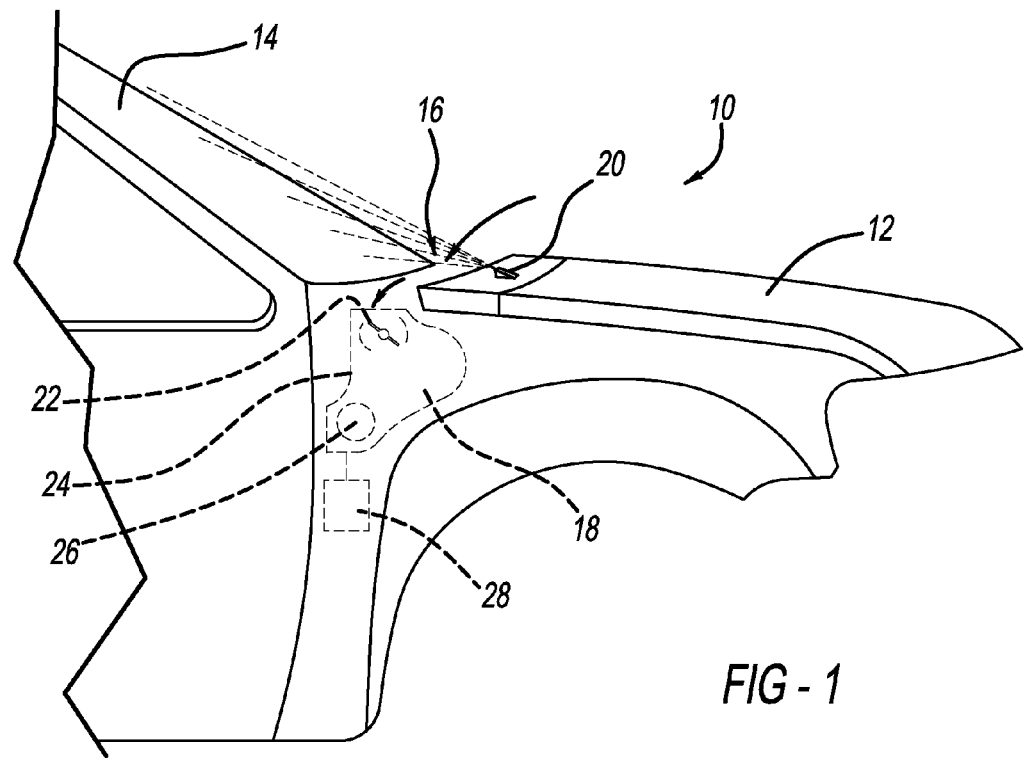
FIG. 1 shows some of the components of the system of the disclosed invention in schematic illustration.

In the following figures, the same reference numerals will be used to refer to the same components. In the following description, various operating parameters and components are described for different constructed embodiments. These specific parameters and components are included as examples and are not meant to be limiting.

In general, the disclosed invention provides a climate control system that is able to automatically switch the climate control system from the fresh air mode to the recirculation mode when the windshield washer fluid spray is activated. The climate control system is maintained in the recirculation mode until sufficient time has elapsed or if higher priority conditions require switching back to fresh air.

If a windscreen operation is in progress, additional conditions could be evaluated to determine if temporary recirculation or partial recirculation could be used or if return to full fresh air has is required. These conditions include but are not limited to evaluation of fog look-up tables a fog look-up table (or some other data source), wet bulb level, humidity level, air quality level, and temperatures. If the conditions require partial recirculation or full fresh air and switching to full recirculation is not possible, reduction of blower level may be used to minimize the levels of odor transfer to the cabin during windshield washer mode.

Referring to FIG. 1, an automotive vehicle, generally illustrated as 10, is provided with the climate control system of the disclosed invention. The vehicle 10 includes an engine hood 12 located at a forward extremity of the vehicle 10 and a windshield 14 sloped upwardly and rearwardly from the engine hood 12. Between the engine hood 12 and the leading edge of the windshield 14 is disposed a cowling 16 that functions to draw fresh air into the climate control system or the heating, ventilation and air conditioning system (HVAC) 18 of the vehicle 10. Windshield washer fluid sprayers, of which one sprayer 20 is visible, are fitted to the vehicle 10 as is known in the art.

The vehicle 10, the engine hood 12, the windshield 14, the cowling 16, the windshield washer fluid sprayer 20, and the fresh air intake 20 as shown are for illustrative purposes only and are not intended as being limiting as it is understood that each of these components may be varied in overall shape and size.

The cowling 16 is in fluid communication with fresh air intake 22 of the HVAC 18. An airflow controlling gate 24 is pivotably provided adjacent the fresh air intake 22 as is known in the art for regulating the intake of fresh air into the HVAC 18. The HVAC 18 further includes a multi-speed blower 26. The HVAC 18 is operated by a controller such as a control module 28 that incorporates an air mode controller and a timer.

Figure 2:
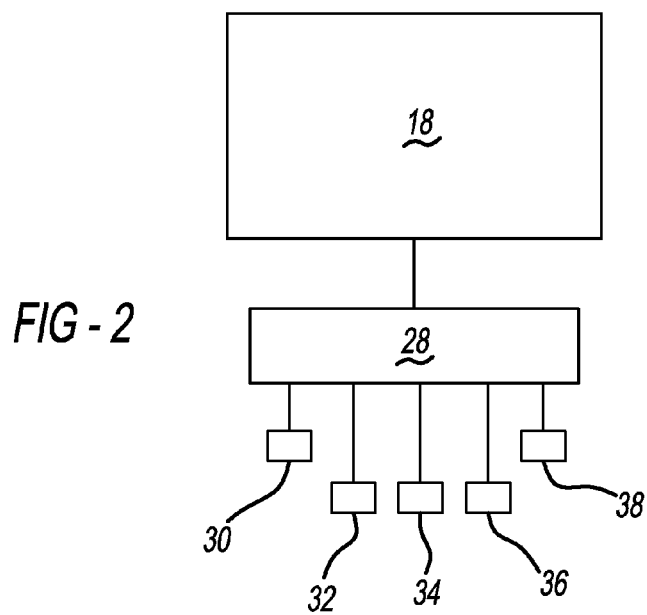
FIG. 2 illustrates a portion of the system of the disclosed invention in simplified block diagram.

Referring to FIG. 2, the HVAC 18 and the control module 28 are illustrated in simplified block diagram format. The control module 28 is adapted to receive a number of condition inputs related to ambient conditions. The condition inputs provide a basis upon which the control module 28 determines which of the fresh, partial recirculated air, or recirculated air modes is to be selected at any given time.

The condition inputs may be several but examples of selective condition inputs are illustrated in FIG. 2 and include, without limitation, a fog look-up table 30 (or some other data source), a wet bulb level sensor 32, a humidity level sensor 34, an air quality level sensor 36, and a temperature level sensor 38. Other condition inputs may be incorporated as well.

Figure 3:
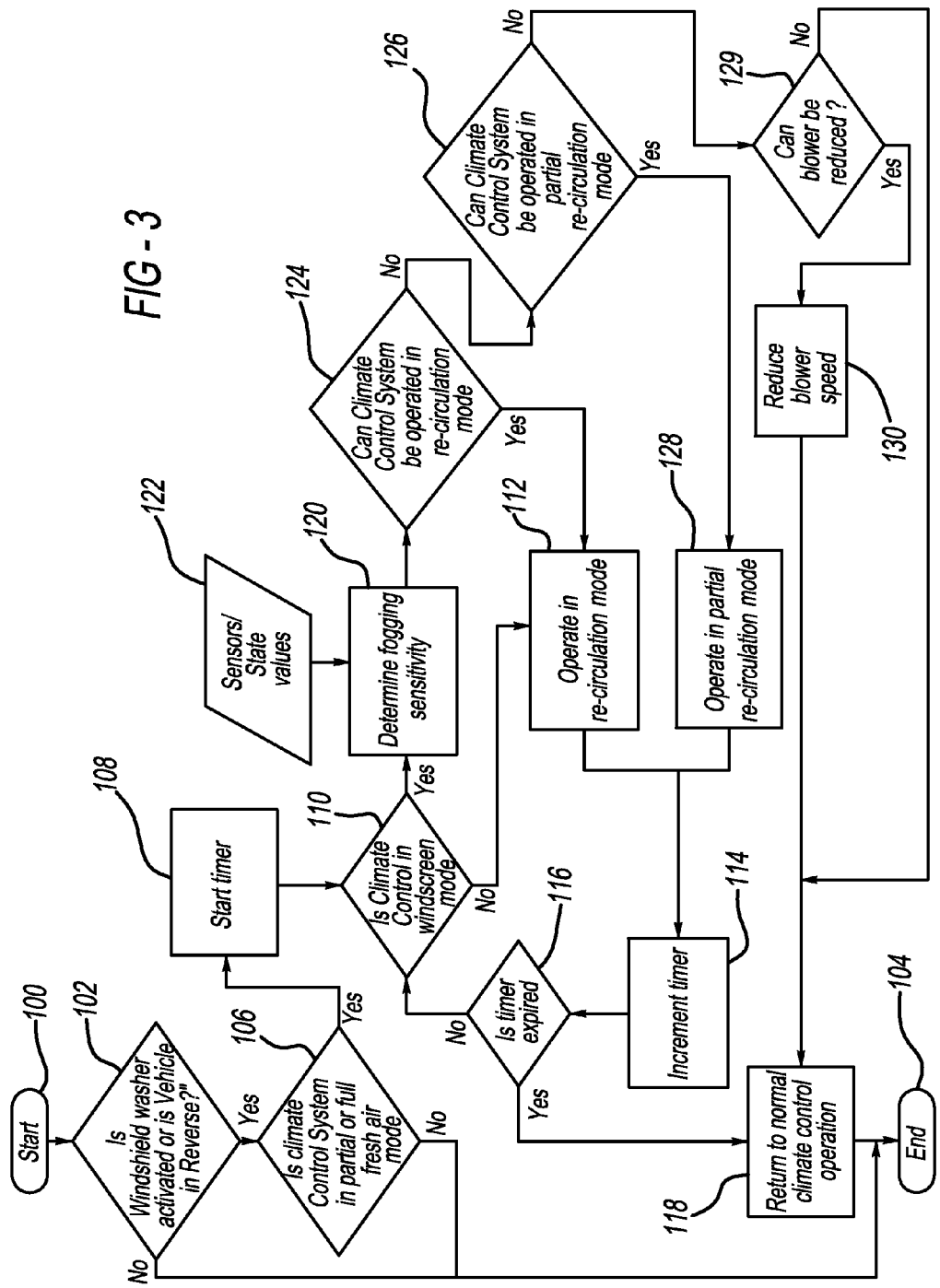
FIG. 3 is a flow chart illustrating operation of a system according to the disclosed invention.

Methods of operating the control module 28 of the climate control system of the disclosed invention are set forth in FIG. 3 which is a flow chart illustrating operation of the system. Referring thereto, at step 100, the vehicle 10 is started. At step 102 an inquiry is made as to whether or not the windshield washer is activated. Optionally, an inquiry may also be made if the vehicle is in reverse. This optional inquiry is made in order to prevent unwanted exhaust gas from entering the vehicle while the driver is backing up to vehicle. If the windshield washer is not activated or if the vehicle is not in reverse then no further steps are taken and activity is at an end 104. However, if the windshield washer is found to be activated or if the vehicle is not in reverse, then an inquiry is made at step 106 as to whether or not the control system is in either the partial recirculation or fresh air mode. If the system is in neither of these modes then no further steps are taken and activity is again at an end 104.

However, if at step 106 it is found that the control system is in either the partial recirculation or fresh air mode, then the timer is started at step 108. With the timer 108 running, an inquiry is made at step 110 as to whether or not the climate control is in windscreen mode. If the response to that inquiry is "no," then the system is set at step 112 to operate in recirculation mode which itself is timed incrementally at step 114. The fresh air mode may also be switched to the full recirculation mode in the event that the vehicle is in put into reverse gear, thereby eliminating any risk of exhaust gases from entering the vehicle cabin. Thereafter an inquiry is made at step 116 as to whether or not the timer is expired. If the timer is expired then the system returns to normal operation at step 118.

If, on the other hand, the timer is found not to have expired at step 116, then an inquiry is again made at step 110 as to whether or not the climate control is in windscreen mode. If the response to that inquiry at step 110 is "no" then the sequence of events described above is followed. In the event that the inquiry made at step 110 is "yes," then a determination of fogging sensitivity is made at step 120 based on condition inputs 122. As noted above with respect to FIG. 2, condition inputs include one or more inputs selected from the group consisting of a fog look-up table (or some other data source), the wet bulb level, the humidity level, the air quality level, and the temperature level.

Once fogging sensitivity is determined at step 120, then an inquiry is made at step 124 as to whether or not the climate control system can be operated in recirculation mode. If the response to that inquiry is "yes," then instructions are given for the system to operate in recirculation mode at step 112 and the sequence of events described above is followed.

On the other hand, if the response to the inquiry at step 124 is "no," then an inquiry is made at step 126 whether or not the climate control system can be operated in partial recirculation mode. If it is found at step 126 that the climate control system can be operated in partial recirculation mode, then the system is set at step 128 to operate in partial recirculation mode which, as with the recirculation mode of step 112, is timed incrementally at step 114. As set forth above, an inquiry is thereafter made at step 116 as to whether or not the timer is expired. If the timer is expired then the system returns to normal operation at step 118 but if the timer is not expired then an inquiry is made at step 110 as to whether or not the climate control is in the windscreen mode. Based on the response to the inquiry at step 110 one of the sequences previously described will be followed.

If it is found at step 126 that the climate control system cannot be operated in partial recirculation mode, then an inquiry is made at step 129 as to whether or not the blower speed can be reduced. If the response at step 129 is "yes," then the blower speed is reduced at step 130.

If at step 129 it is found that the blower speed cannot be reduced, then the system returns to normal operation at step 118.

The disclosed invention as set forth above overcomes the challenges faced by known windshield washer fluid and climate control systems for vehicles by either eliminating or significantly reducing the amount of windshield washer fluid odor present in the vehicle. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A climate control system for a vehicle having a windshield washer fluid system, the system comprising:
   an air mode controller switchable between fresh air mode, a partial fresh air mode, and recirculated air mode;
   a control module communicatively connected to said air mode controller: and a link between the washer fluid system and said air mode control module, whereby when the washer fluid system is activated said air mode control module switches said air mode controller from at least one of said fresh air mode or said partial fresh air mode to said recirculated air mode, said control module including a timer to delay returning from said recirculated mode to at least said partial fresh air mode and said fresh air mode in direct response to deactivation of the washer fluid system.

2. The climate control system for a vehicle of claim 1, further including at least on ambient condition input, wherein said ambient condition input is at least a fog information data source, a wet bulb level, a humidity level, an air quality level and a temperature level.

3. The climate control system for a vehicle of claim 2 wherein said control module directs said air controller to switch to said fresh air mode based on one or more of said ambient condition input.

4. The climate control system for a vehicle of claim 2 wherein said control module further includes a delay timer to delay returning from said recirculated mode to said fresh air mode following deactivation of the washer fluid system based on one or more of said condition inputs.

5. A method of controlling a climate system for a vehicle having a windshield washer fluid system, the method comprising:
   forming a system comprising an air controller switchable between fresh and recirculated air modes, a control module connected to said controller, and a link between the washer fluid system and said module, said control module including condition inputs and a delay timer;
   having said module switch said controller from said fresh air mode to said recirculated air mode and lowering a speed of a multi-speed blower during switching of air modes when said washer fluid system is activated, and delaying returning from said recirculated mode to said fresh air mode in direct response to deactivation of the washer fluid system.

6. The method of controlling a climate system for a vehicle of claim 5 wherein said air controller further includes a partial recirculated air mode and wherein said control module can switch said air controller between said fresh air, recirculated, and partial recirculated air modes.

7. The method of controlling a climate system for a vehicle of claim 5 further including condition inputs taken from the group consisting of a fog information data source, wet bulb level, humidity level, air quality level, and temperature level.

8. The method of controlling a climate system for a vehicle of claim 7 wherein said control module directs said air controller to switch to the fresh air mode based on one or more of said condition inputs.

9. The method of controlling a climate system for a vehicle of claim 5 further including the multi-speed blower connected to said control module and wherein said module can switch said multi-speed blower to a lower speed in the event that switching to said recirculated air mode is not possible based on one or more of said inputs.

10. A climate control system for a vehicle having a windshield washer fluid system, the system comprising;
   an air mode controller switchable between fresh air and recirculated air modes; a control module connected to said controller;
   condition inputs associated with said module, said inputs being taken from the group consisting of a fog information data source, wet bulb level, and air quality level; and
   a link between the washer fluid system and said control module, whereby when the washer fluid system is activated said control module switches said air controller from said fresh air mode to said recirculated air mode and lowering a speed of a multi-speed blower during switching of air modes.

\* \* \* \* \*